United States Patent
Usui et al.

(10) Patent No.: US 10,807,671 B2
(45) Date of Patent: *Oct. 20, 2020

(54) ELECTRICAL BICYCLE OPERATING SYSTEM

(71) Applicant: Shimano Inc., Sakai-shi, Osaka (JP)

(72) Inventors: Makoto Usui, Sakai (JP); Keijiro Nishi, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 284 days.

This patent is subject to a terminal disclaimer.

(21) Appl. No.: 15/954,487

(22) Filed: Apr. 16, 2018

(65) Prior Publication Data
US 2019/0315423 A1    Oct. 17, 2019

(51) Int. Cl.
| | |
|---|---|
| *B62J 99/00* | (2020.01) |
| *B62J 1/08* | (2006.01) |
| *B62K 25/04* | (2006.01) |
| *B62L 3/00* | (2006.01) |
| *B62M 25/08* | (2006.01) |

(Continued)

(52) U.S. Cl.
CPC ............ *B62J 99/00* (2013.01); *B62J 1/08* (2013.01); *B62K 25/04* (2013.01); *B62L 3/00* (2013.01); *B62M 6/45* (2013.01); *B62M 25/08* (2013.01); *B62J 45/20* (2020.02); *B62J 45/40* (2020.02);

(Continued)

(58) Field of Classification Search
CPC ..... B62J 99/00; B62J 1/08; B62J 6/165; B62J 6/16; B62J 50/20; B62J 45/00; B62M 9/123; B62M 9/132; B62M 9/133; B62M 6/45; B62M 9/122; B62K 25/08;

(Continued)

(56) References Cited

U.S. PATENT DOCUMENTS

| | | | |
|---|---|---|---|
| 6,450,060 B1* | 9/2002 | Shahana | B62K 23/06 74/502 |
| 6,741,045 B2* | 5/2004 | Kitamura | B62M 25/08 318/14 |

(Continued)

FOREIGN PATENT DOCUMENTS

| | | |
|---|---|---|
| CN | 102730143 A | 10/2012 |
| DE | 202015103054 U1 | 10/2015 |

OTHER PUBLICATIONS

Toyoto Shirai et al., "Electrical Bicycle Operating System," Application as Filed in U.S. Appl. No. 15/646,006, filed Jul. 10, 2017, 94 pages.

*Primary Examiner* — Mussa A Shaawat
(74) *Attorney, Agent, or Firm* — Alleman Hall Creasman & Tuttle LLP

(57) ABSTRACT

An electrical bicycle operating system includes a first switch unit that includes a first switch group configured to be mounted to a bicycle on a first side of a central longitudinal axis of the bicycle, the first switch group including a first switch and a second switch having a first position and a second position in the first switch group. Also included is a second switch unit that includes a second switch group configured to be mounted to the bicycle on an opposite side from the first side, the second switch group including a third switch having a same position as the first position. A control unit is configured to generate a first signal where the first switch unit is actuated, a second signal where the second switch unit is actuated, and a third signal where the first switch unit and the second switch unit are actuated concurrently.

21 Claims, 6 Drawing Sheets

(51) Int. Cl.
  *B62M 6/45* (2010.01)
  *B62J 45/20* (2020.01)
  *B62J 45/40* (2020.01)
  *B62J 50/20* (2020.01)

(52) U.S. Cl.
  CPC .......... *B62J 50/20* (2020.02); *B62J 2001/085* (2013.01); *B62K 2025/045* (2013.01)

(58) Field of Classification Search
  CPC .. B62K 23/02; B62K 25/04; B62K 2025/047; Y10T 74/2003
  See application file for complete search history.

(56) References Cited

U.S. PATENT DOCUMENTS

| | | | | |
|---|---|---|---|---|
| 6,997,835 | B2* | 2/2006 | Fukuda | B62M 25/08 |
| | | | | 474/82 |
| 8,202,182 | B2* | 6/2012 | Ishikawa | B62M 9/1248 |
| | | | | 192/226 |
| 8,886,417 | B2 | 11/2014 | Jordan | |
| 2007/0137361 | A1* | 6/2007 | Fujii | H01H 21/10 |
| | | | | 74/473.13 |
| 2012/0086380 | A1* | 4/2012 | Krieger | H02P 7/06 |
| | | | | 318/497 |
| 2012/0253601 | A1* | 10/2012 | Ichida | B60L 58/13 |
| | | | | 701/37 |
| 2012/0253606 | A1* | 10/2012 | Takamoto | B62J 15/00 |
| | | | | 701/48 |
| 2013/0061705 | A1* | 3/2013 | Jordan | B62L 3/02 |
| | | | | 74/473.13 |
| 2014/0015659 | A1* | 1/2014 | Tetsuka | B62K 23/02 |
| | | | | 340/432 |
| 2014/0053675 | A1* | 2/2014 | Tetsuka | B62M 25/08 |
| | | | | 74/473.13 |
| 2014/0058578 | A1* | 2/2014 | Tetsuka | B62K 23/00 |
| | | | | 701/1 |
| 2015/0033896 | A1 | 2/2015 | Jordan | |
| 2015/0137591 | A1* | 5/2015 | Fusari | B62M 25/08 |
| | | | | 307/9.1 |
| 2015/0203169 | A1* | 7/2015 | Nishino | B62K 23/06 |
| | | | | 74/491 |
| 2016/0152302 | A1* | 6/2016 | Nishino | B62M 25/08 |
| | | | | 701/2 |
| 2016/0159432 | A1* | 6/2016 | Nishikawa | B62M 6/50 |
| | | | | 701/22 |
| 2016/0185421 | A1* | 6/2016 | Komatsu | B62M 9/12 |
| | | | | 701/2 |
| 2016/0244120 | A1* | 8/2016 | Gerencser | B62K 15/008 |
| 2016/0257269 | A1* | 9/2016 | Watarai | B62M 25/08 |
| 2016/0257377 | A1* | 9/2016 | Hashimoto | B62M 25/08 |
| 2016/0311491 | A1* | 10/2016 | Watarai | H05B 47/19 |
| 2016/0318583 | A1* | 11/2016 | Watarai | B62M 25/08 |
| 2016/0362154 | A1* | 12/2016 | Poole | B62J 3/00 |
| 2017/0158281 | A1* | 6/2017 | Hara | B62M 25/08 |
| 2017/0203814 | A1* | 7/2017 | Kurokawa | B62K 23/00 |
| 2017/0225743 | A1* | 8/2017 | Hara | B62M 9/132 |
| 2018/0118305 | A1* | 5/2018 | Tsuchizawa | B62M 9/122 |
| 2018/0178870 | A1* | 6/2018 | Takeshita | B62J 99/00 |
| 2018/0183255 | A1* | 6/2018 | Shahana | H02J 7/0063 |
| 2018/0257736 | A1* | 9/2018 | Komatsu | B62K 25/08 |
| 2019/0054968 | A1* | 2/2019 | Kurokawa | B62M 9/122 |

* cited by examiner

| ROW | SWITCH | LEFT SWITCH | RIGHT SWITCH | BOTH SWITCHES |
|---|---|---|---|---|
| 1 | 1, 3 | rear derailleur shift down | rear derailleur shift up | automatic transmission ON/OFF |
| 2 | 1, 3 | front derailleur shift down | front derailleur shift up | synchro shifting mode ON/OFF |
| 3 | 1, 3 | assist force mode down | assist force mode up | setting screen menu |
| 4 | 1, 3 | assist force mode down | assist force mode up | walk mode ON/OFF |
| 5 | 1, 3 | first computer operation | second computer operation | power meter calibration ON/OFF |
| 6 | 2, 4 | rear derailleur shift down | rear derailleur shift up | electrical seat post assembly up/down |
| 7 | 2, 4 | front derailleur shift down | front derailleur shift up | suspension lock/unlock |
| 8 | 2, 4 | suspension mode down | suspension mode up | electrical seat post assembly up/down |
| 9 | 2, 4 | assist force mode down | assist force mode up | light ON/OFF |
| 10 | 2, 4 | assist force mode down | assist force mode up | bicycle computer screen ON/OFF |
| 11 | 2, 4 | first computer operation | second computer operation | camera recording ON |

FIG. 6

ELECTRICAL BICYCLE OPERATING SYSTEM

BACKGROUND

Bicycling is becoming an increasingly popular form of recreation as well as a means of transportation. Moreover, bicycling has become a very popular competitive sport for both amateurs and professionals. At any skill level, bicycle components and accessories may be useful to a rider for improving the bicycling experience. Control components offer a rider customization of bicycling gear and may simplify bicycle operation. Depending on rider use of the bicycle, control components and operating systems may control specific parts and operations of the bicycle. Riders may choose controlling devices and operating systems specific to racing, mountain biking, long-distance travel, and the like. Designing these control devices and operating systems may require attention to efficiency, simplicity of use, and functionality, among other factors.

SUMMARY

An electrical bicycle operating system developed is disclosed herein. In accordance with a first aspect of the present invention, an electrical bicycle operating system comprises a first switch unit, a second switch unit, and a control unit. The first switch unit includes a first switch group configured to be mounted to a bicycle on a first side of a central longitudinal axis of the bicycle, and the second switch unit includes a second switch group configured to be mounted to the bicycle on an opposite side of the central longitudinal axis from the first side. The first switch group includes a first switch and a second switch having a first position and a second position in the first switch group. The second switch group includes a third switch having a same position as the first position, in the second switch group. The control unit is configured to generate a first signal, a second signal, and a third signal. The first signal is generated in a first state where the first switch unit is actuated and the second switch unit is not actuated. The second signal is generated in a second state where the second switch unit is actuated and the first switch unit is not actuated. The third signal is generated in a third state where the first switch unit and the second switch unit are actuated concurrently.

With the electrical bicycle operating system according to the first aspect, it is possible to control bicycle functionality by transmitting commands to components of the bicycle associated with actuating of one of the switches, the other switch, and actuating a combination of switches.

In accordance with a second aspect of the present invention, the electrical bicycle operating system according to the first aspect is configured so that the first signal includes one of an upshift signal and a downshift signal. The second signal includes the other of the upshift signal and the downshift signal.

With the electrical bicycle operating system according to the second aspect, front and rear derailleurs may be shifted up or down depending on input from a rider seated on the bicycle.

In accordance with a third aspect of the present invention, the electrical bicycle operating system according to any one of the first aspect to the second aspect is configured so that the first signal and the second signal are indicative of operating at least one bicycle component selected from the group consisting of an electronic shifting device, an electronic suspension system, an electrical seat post assembly, a brake device, and a driving motor for assist force.

With the electrical bicycle operating system according to the third aspect, the rider may engage with bicycle components via the operating system in a manner that is customized to the needs and requirements of the rider.

In accordance with a fourth aspect of the present invention, the electrical bicycle operating system according to any one of the first aspect to the third aspect is configured so that the second switch group includes a fourth switch having a same position as the second position, in the second switch group. The control unit is further configured to generate a fourth signal, a fifth signal, and a sixth signal. The fourth signal is generated in a fourth state where the second switch is actuated and the first switch is not actuated. The fifth signal is generated in a fifth state where the fourth switch is actuated and the third switch is not actuated. The sixth signal is generated in a sixth state where the second switch and the fourth switch are actuated concurrently.

With the electrical bicycle operating system according to the fourth aspect, a fourth, fifth, and sixth signal may be added to the first, second, and third signals to increase the range of functionality of the electrical bicycle operating system.

In accordance with a fifth aspect of the present invention, the electrical bicycle operating system according to any one of the first aspect to the fourth aspect is configured so that the first switch group is oriented in relation to the first switch in a first direction. The second switch group is oriented in relation to the third switch in the first direction.

With the electrical bicycle operating system according to the fifth aspect, the first and second switch groups may be oriented in parallel with respect to each other to facilitate rider interaction with the switches.

In accordance with a sixth aspect of the present invention, the electrical bicycle operating system according to any one of the fourth aspect to the fifth aspect is configured so that the first switch and the second switch are aligned in a vertical direction as viewed from a perspective of a rider seated on the bicycle. The third switch and the fourth switch are aligned in a vertical direction as viewed from the perspective of the rider seated on the bicycle.

With the electrical bicycle operating system according to the sixth aspect, it is possible to arrange the switches in a vertical direction to minimize the amount of space taken by the switches along a handlebar of the bicycle.

In accordance with a seventh aspect of the present invention, the electrical bicycle operating system according to any one of the first aspect to the sixth aspect is configured so that the third signal includes at least one signal selected from the group consisting of an automatic shifting signal, a synchro shifting mode signal, a setting screen transition signal, and an electrical seat post assembly signal.

With the electrical bicycle operating system according to the seventh aspect, the third signal may be associated with a command separately from the first and second signals, thus increasing the range of signals effected by the electrical bicycle operating system.

In accordance with an eighth aspect of the present invention, the electrical bicycle operating system according to any one of the first aspect to the seventh aspect is configured so that the third signal is indicative of operating at least one bicycle component selected from the group consisting of an automatic shifting device, a synchro shifting device, a setting screen device, and an electrical seat post assembly.

With the electrical bicycle operating system according to the eighth aspect, it is possible to control a different bicycle component with the third signal than with the first and second signals, thus increasing the range of control of the electrical bicycle operating system.

In accordance with a ninth aspect of the present invention, the electrical bicycle operating system according to any one of the fourth aspect to the sixth aspect is configured so that the fourth signal includes one of an upshift signal and a downshift signal. The fifth signal includes the other of the upshift signal and the downshift signal.

With the electrical bicycle operating system according to the ninth aspect, it is possible to assign shifting up or down of the front and rear derailleurs to the second and fourth switches instead of the first and third switches.

In accordance with a tenth aspect of the present invention, the electrical bicycle operating system according to any one of the fourth aspect to the sixth aspect and the ninth aspect is configured so that the fourth signal and the fifth signal are indicative of operating at least one bicycle component selected from the group consisting of an electronic shifting device, an electronic suspension system, an electrical seat post assembly, a brake device, and a driving motor for assist force.

With the electrical bicycle operating system according to the tenth aspect, the rider may engage with bicycle components via the operating system that is further customized to the needs and requirements of the rider compared to a configuration where bicycle components may only be controlled by the first, second, and third signals.

In accordance with an eleventh aspect of the present invention, the electrical bicycle operating system according to any one of the fourth aspect to the sixth aspect and the ninth aspect to the tenth aspect is configured so that the sixth signal includes at least one signal selected from the group consisting of an automatic shifting signal, a synchro shifting signal, a setting screen transition signal, and an electrical seat post assembly signal.

With the electrical bicycle operating system according to the eleventh aspect, it is possible to assign control of bicycle components to the fourth, fifth, and sixth signals such that a related set of operations may be associated with the second switch, fourth switch, and the combination of the second switch and the fourth switch.

In accordance with a twelfth aspect of the present invention, the electrical bicycle operating system according to any on of the fourth aspect to the sixth aspect and the ninth aspect to the eleventh aspect is configured so that the sixth signal is indicative of operating at least one bicycle component selected from the group consisting of an automatic shifting device, a synchro shifting device, a setting screen device, and an electrical seat post assembly.

With the electrical bicycle operating system according to the twelfth aspect, it is possible to control an additional bicycle component with the sixth signal as generated by actuating a second combination of switches.

In accordance with a thirteenth aspect of the present invention, the electrical bicycle operating system according to any one of the first aspect to the twelfth aspect is configured so that the first switch unit includes a first housing on which the first switch group is provided. The second switch unit includes a second housing on which the second switch group is provided.

With the electrical bicycle operating system according to the thirteenth aspect, the first housing and second housing may protect the respective switch group.

In accordance with a fourteenth aspect of the present invention, the electrical bicycle operating system according to any one of the fourth aspect to the sixth aspect and the ninth aspect to the thirteenth aspect is configured so that the first switch is housed in a first housing and the third switch is housed in a second housing. The second switch is also housed in the first housing and the fourth switch is also housed in the second housing.

With the electrical bicycle operating system according to the fourteenth aspect, it is possible to arrange the first switch through the fourth switch such that actuating each switch may be performed from a preferred position of the rider.

In accordance with a fifteenth aspect of the present invention, the electrical bicycle operating system according to the fourteenth aspect is configured so that the first housing is configured to mount to one of a right part or a left part of a handlebar.

With the electrical bicycle operating system according to the fifteenth aspect, it is possible to arrange the switches such that each switch group is accessible mainly by one or the other hand of the rider.

In accordance with a sixteenth aspect of the present invention, the electrical bicycle operating system according to any one of the fourteenth aspect to the fifteenth aspect is configured so that the second housing is configured to mount to the other one of the right part or the left part of the handlebar.

With the electrical bicycle operating system according to the sixteenth aspect, it is possible to arrange the switches such that each switch group may be operated with regard for ergonomic positioning.

In accordance with a seventeenth aspect of the present invention, the electrical bicycle operating system according to any one of the fourteenth aspect to the sixteenth aspect is configured so that the first housing is disposed to receive user input from a first thumb of a user. The second housing is disposed to receive user input from a second thumb of the user.

With the electrical bicycle operating system according to the seventeenth aspect, the rider may actuate the switches with minimal movement of hands off the handlebars.

In accordance with an eighteenth aspect of the present invention, the electrical bicycle operating system according to any one of the fourth aspect to the sixth aspect, the ninth aspect to the twelfth aspect, and the fourteenth aspect to the seventeenth aspect further comprises the control unit further configured to generate a seventh signal at least in a seventh state where selected switches are other than switches selected in the third state and the sixth state.

With the electrical bicycle operating system according to the eighteenth aspect, an additional signal may be generated to increase the range of functionality of the electrical bicycle operating system.

In accordance with a nineteenth aspect of the present invention, the electrical bicycle operating system according to the eighteenth aspect is configured so that the selected switches include at least two switches configured to be operated concurrently by one combination of digits selected from the group consisting of one thumb and one index finger of a user, both thumbs of the user, and both index fingers of the user.

With the electrical bicycle operating system according to the nineteenth aspect, the switches initiating the seventh signal may be actuated as suits the preferences of a rider and ergonomic feasibility.

In accordance with a twentieth aspect of the present invention, the electrical bicycle operating system according to any one of the eighteenth aspect to the nineteenth aspect is configured so that the seventh signal is indicative of shutting down the electrical bicycle operating system.

With the electrical bicycle operating system according to the twentieth aspect, a signal that is generated in a manner distinct from the first through the sixth signals may be assigned to shut down the electrical bicycle operating system, and a rider may be unlikely to unintentionally shut down the electrical bicycle operating system.

In accordance with a twenty-first aspect of the present invention, the electrical bicycle operating system according to any one of the first aspect to the twentieth aspect further comprises a wireless communicator configured to transmit, via the control unit, at least one of the first signal and the second signal.

With the electrical bicycle operating system according to the twenty-first aspect, it is possible to wirelessly control various bicycle components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 is a table presenting possible embodiments of signals and operation of components by actuation of various switches and combinations of switches.

DETAILED DESCRIPTION OF EMBODIMENTS

Figure 1:
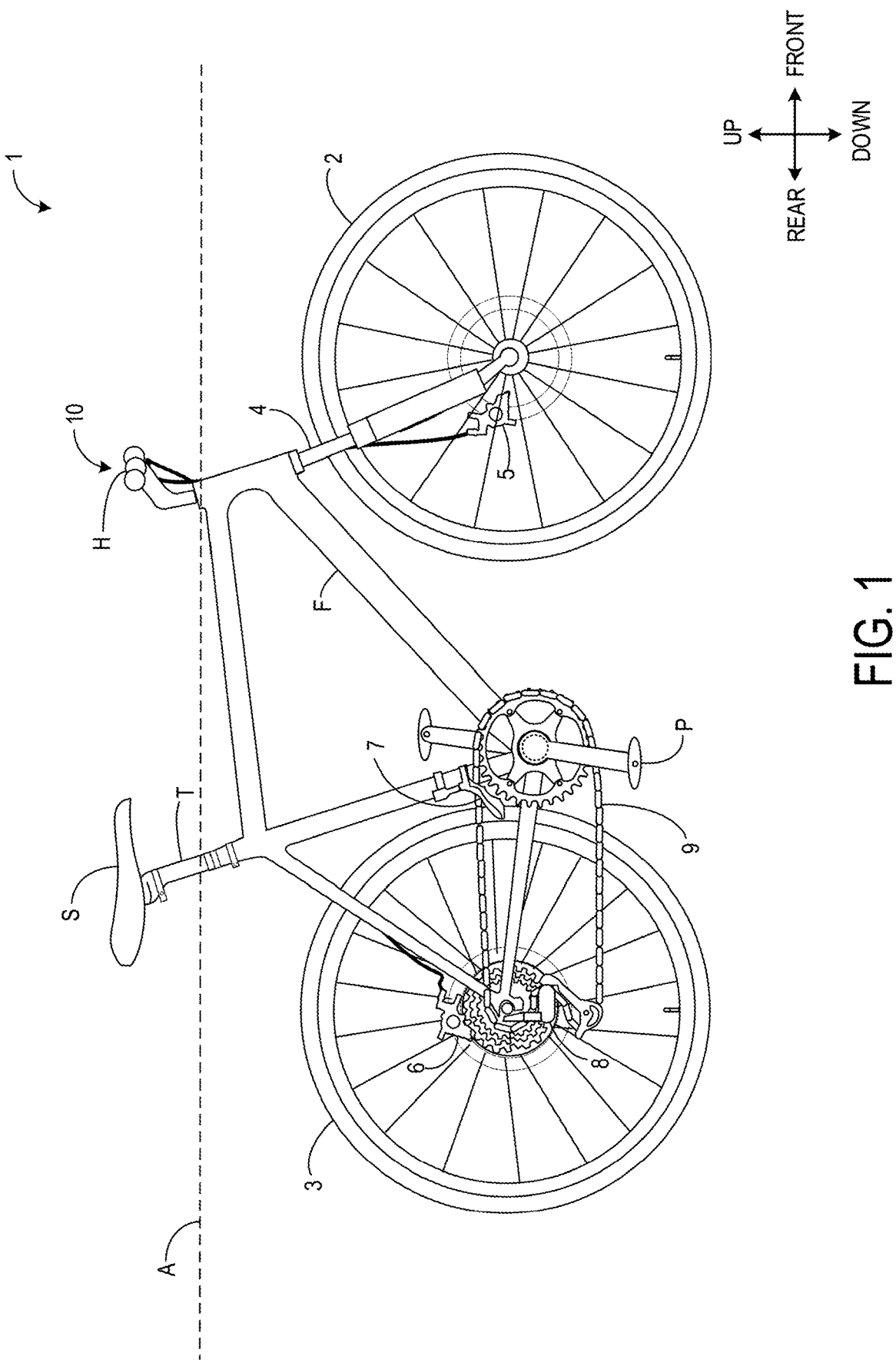
FIG. 1 is a side view of a bicycle having an electric bicycle operating system in accordance with a first embodiment.

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

First Embodiment

Figure 2:
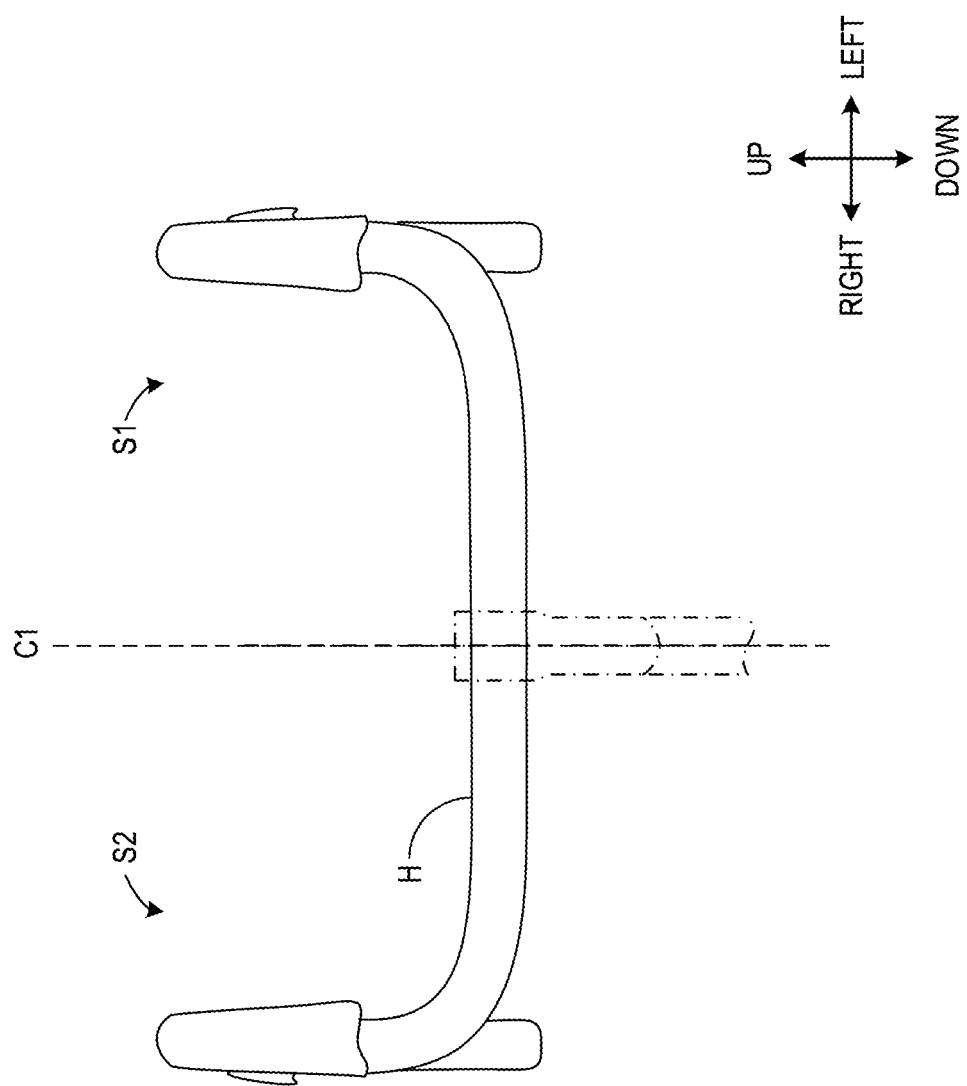
FIG. 2 is a schematic outline of a handlebar of the bicycle of FIG. 1.

Referring initially to FIG. 1, an exemplary bicycle 1 having an electrical bicycle operating system 10 in accordance with a first embodiment is illustrated. The bicycle 1 may be, for example, a road type bicycle. Alternatively, the bicycle 1 may be an off-road bicycle such as a cyclocross bicycle or mountain bike. The bicycle 1 includes a handlebar H, front and rear wheels 2 and 3, front fork 4, front and rear brake devices 5 and 6, front derailleur 7, rear derailleur 8, bicycle chain 9, pedals P attached to crank arms, frame F, and seat post T beneath bicycle seat S. A dashed line in FIG. 1 indicates a central longitudinal axis A of the bicycle 1. As shown in a schematic outline of a handlebar of the bicycle 1, FIG. 2, the bicycle 1 may have a bicycle center plane C1 in which central longitudinal axis A lies, the bicycle center plane C1 separating a first side S1 (left half) from a second side S2 (right half) of the bicycle 1. The following directional terms "front," "rear," "forward," "rearward," "left," "right," "transverse," "upward," and "downward," as well as any other similar directional terms, refer to those directions which are determined on the basis of a rider sitting upright on a seat S of the bicycle 1 while facing the handlebar H, for example.

The handlebar H may be a drop type handlebar. Alternatively, the handlebar H may be a bullhorn type, flat type, or other type of handlebar. The electrical bicycle operating system 10 may be mounted on the handlebar H to receive user input from a rider riding the bicycle 1. The brake devices 5, 6 may impart a braking force on one or both of the front and rear wheels 2, 3 in response to the user input. The brake devices 5, 6 may include a hydraulic system for brake control. The front and rear derailleurs 7, 8 may be configured to enact a gear shift in response to the user input by shifting the chain 9 in a transverse direction of the bicycle 1. A front fork 4 attaches a front wheel 2 to the frame F; engaged with the front fork 4 may be a suspension system SS that may include a damping system and a spring system. Bicycle seat S atop seat post T may be adjustable in height in response to user input; for example, the seat post T may be telescopically adjustable either manually or by electronic control. Pedals P on either side of the bicycle 1 are attached to corresponding crank arms. The crank arms are mounted on either side of the frame F at 180 degrees from one another and are connected by a crank axle. The bicycle 1 of the present embodiment is driven by a chain drive transmission system that includes a bicycle chain 9 engaged with one of a cassette of rear sprockets and a front bicycle sprocket. A driving force applied to the pedals P is transferred to the crank arms, which rotate the crank axle and the bicycle sprocket. As the bicycle sprocket rotates, the bicycle chain 9 is driven around the bicycle sprocket and transmits power to the rear wheel 3 to propel the bicycle 1. Other parts of the bicycle 1 are well known and are not described herein.

Figure 3:
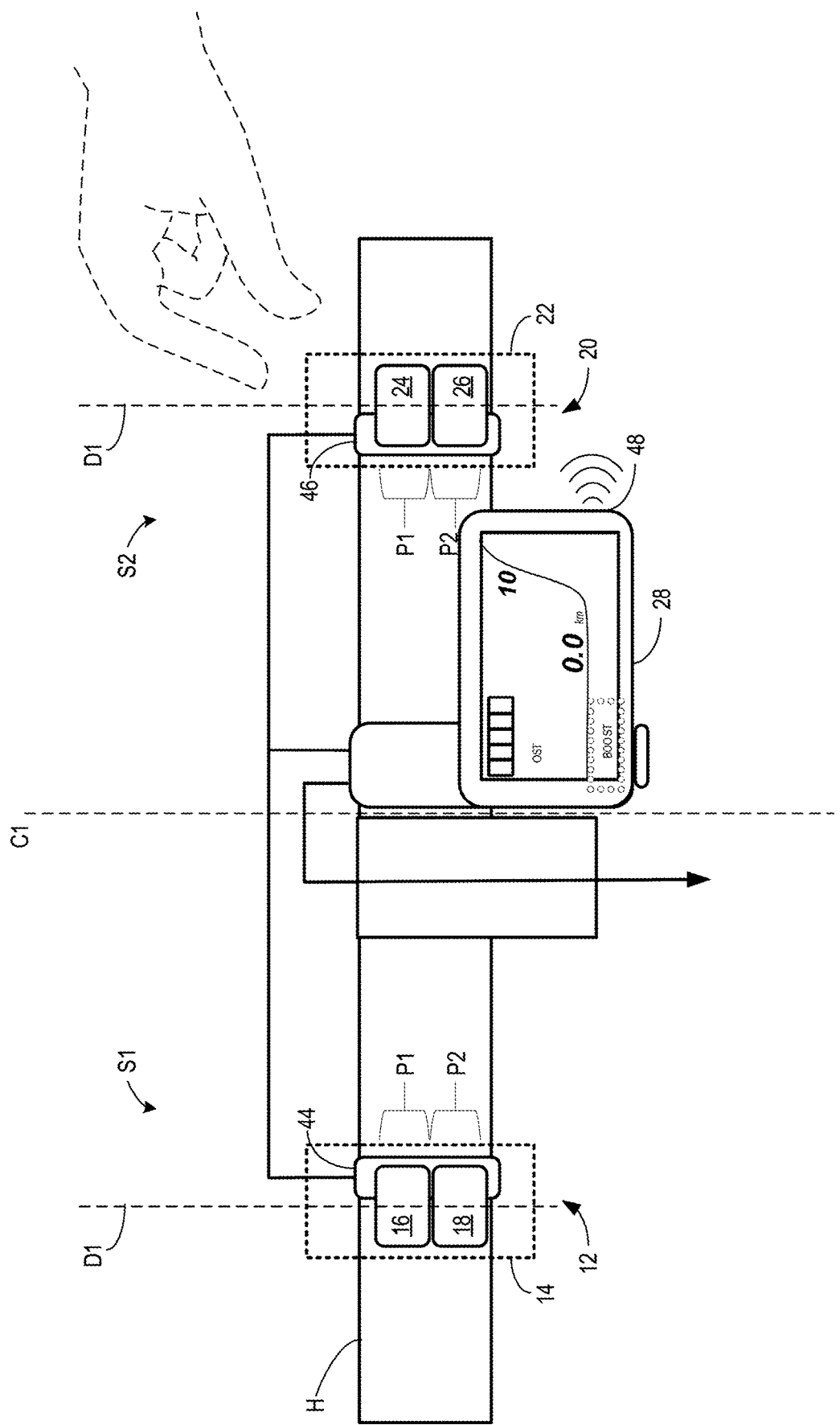
FIG. 3 is a schematic of a front view from a rider's perspective of the electrical bicycle operating system.

Turning to FIG. 3, the electrical bicycle operating system 10 includes a first switch unit 12 that includes a first switch group 14 configured to be mounted to the handlebar H of the bicycle 1 on a first side S1 of the central longitudinal axis A that lies in center plane C1 of the bicycle 1. The first switch group 14 includes a first switch 16 and a second switch 18. First switch 16 has a first position P1 and second switch 18 has a second position P2 in the first switch group 14. FIG. 3 shows a front view of the first switch unit 12 of the electrical bicycle operating system 10. The handlebar H is indicated to pass through an opening in the first switch unit 12, the opening not explicitly shown in FIG. 3. A second switch unit 20 includes a second switch group 22 configured to be mounted to the bicycle 1 on the opposite side of the first side S1, which is the second side S2, of the central longitudinal axis A that lies in center plane C1 of the bicycle 1. The second switch group 22 includes a third switch 24 having a same position as the first position P1, in the second switch group 22. It will be appreciated that in alternative embodiments the first and second switch units 12, 20 may be modified in composition and arrangement, although maintaining the same operation. For example, the switches in each switch group may be staggered along a vertical line or arranged horizontally adjacent to each other; the relative arrangement of first position P1 to second position P2 may or may not be maintained in each of the first and second switch units 12, 20. The first switch unit 12 and the second switch unit 20 may also be arranged on the same side of the central longitudinal axis A. Additionally, the first and second switch units 12, 20 may be mounted to other parts of the bicycle 1.

Figure 4:
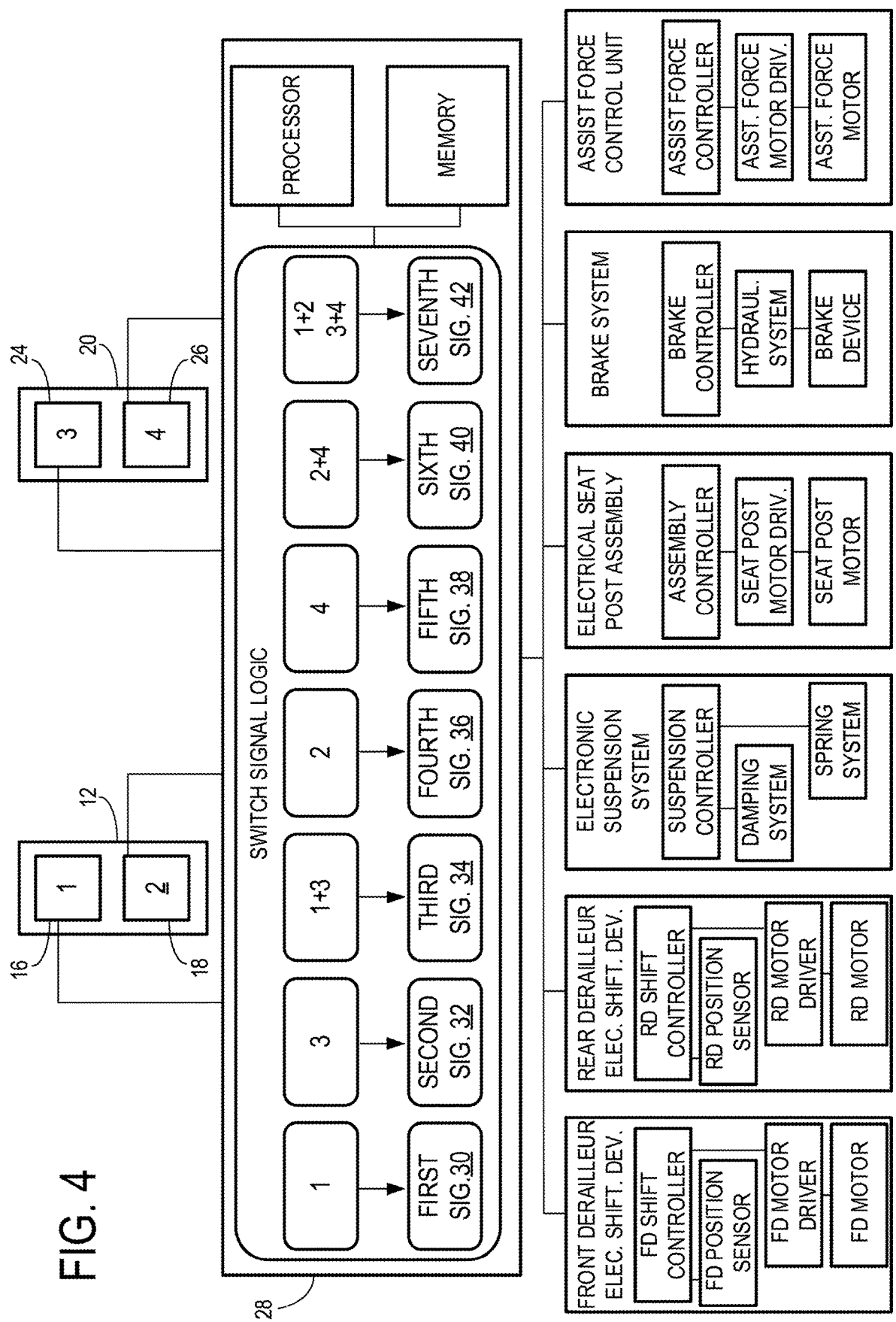
FIG. 4 is a schematic of a control unit of the electrical bicycle operating system.

FIG. 3 depicts a control unit 28 as mounted to the handlebar H, although in other embodiments it may be mounted to other components of the bicycle 1. FIG. 4 is a schematic of the control unit 28. It will be appreciated that the composition of the control unit 28 is not limited to the embodiment shown in FIG. 4. The control unit 28 can be configured to be constituted as a microcomputer and include a processor, memory, and circuit board. The processor includes a central processing unit (CPU) and a memory controller. The memory includes a read-only memory (ROM) and a random-access memory (RAM). The ROM includes a non-transitory computer-readable storage medium. The RAM includes a transitory computer-readable storage medium. The memory further includes storage areas each having an address in the ROM and the RAM. The processor controls the memory to store data in the storage areas of the memory and reads data from the storage areas of the memory. At least one program is stored in the memory (e.g., the ROM). The at least one program is read into the processor, and thereby functions of the control unit 28 are performed. The processor and the memory are mounted on the circuit board and are connected to each other with a bus. This is indicated with a line in the schematic of the control unit 28 in FIG. 4.

The control unit 28 may be connected to other components of the electrical bicycle operating system 10 not shown in FIG. 4. Connections between components may include power line communication (PLC), wireless communication, or other types of connections. In an embodiment implementing PLC, the electrical bicycle operating system 10 and the controlled bicycle components are configured to communicate with each other through the voltage line using the PLC technology. PLC may carry data on a conductor that is also used simultaneously for electric power transmission or electric power distribution to electric components; unique identifying information such as a unique identifier is assigned to each of the switches, the control unit, and the controlled bicycle components. In turn, the switches, the control unit, and the controlled bicycle components include a PLC controller in which the unique identifying information is stored. From this unique identifying information, the switches, the control unit, and the controlled bicycle components recognize control signals specific to the unit or component from among the control signals transmitted via the electric communication path. For example, the control unit 28 can recognize the control signal transmitted from one of the switches via the electric communication path. Alternatively, separate signal wires can be provided for transmitting data in addition to ground and voltage wires if required or preferred.

In one embodiment, the switches are connected to the control unit 28 via PLC, which also connects the control unit 28 to a battery (not shown). In this embodiment, the battery is mounted on the bicycle frame F. It will be appreciated that in other embodiments, the battery is mounted to other parts of the bicycle 1. It will be further appreciated that other electric power sources may be used instead of batteries, or batteries may be used in combination with other electric power sources. The battery is also connected via PLC to a bicycle component, such as the rear derailleur 8. In an alternative configuration, the switches are connected via PLC to the control unit 28 that is further connected to a motor driver of a bicycle component, also by way of PLC. In this configuration, the motor driver is connected to a battery as well, the motor driver therefore being controllable by way of the control unit 28 through a PLC connection and powered by a battery through a non-PLC connection. Alternatively, the battery may be connected to the front derailleur 7, the suspension system SS, the seat post T, and/or a wireless unit. In one embodiment employing a wireless unit, the switches are connected via PLC to the control unit 28 that includes a wireless communicator 48. Such an embodiment is shown in FIG. 3. As described above, PLC connects the control unit 28 to the battery (not shown) and a bicycle component such as the rear derailleur 8. The wireless communicator 48 is connected to a wireless unit external to the control unit 28 via wireless communication. The wireless unit receives signals from the wireless communicator 48 when switches are actuated and a control operation is initiated at the control unit 28. Another component with which the wireless communicator 48 may be connected via wireless communication is, in one embodiment, a wireless camera. In such an embodiment, when the appropriate switch is actuated, the wireless communicator 48 of the control unit 28 sends a wireless communication signal to the camera to begin recording.

The control unit 28 is configured to generate a first signal 30 in a first state where the first switch unit 12 is actuated and the second switch unit 20 is not actuated. The control unit 28 is further configured to generate a second signal 32 in a second state where the second switch unit 20 is actuated and the first switch unit 12 is not actuated. The control unit 28 additionally generates a third signal 34 in a third state where the first switch unit 12 and the second switch unit 20 are actuated concurrently. In the first embodiment, generating the first signal 30 follows actuation of the first switch 16 of the first switch unit 12; generating the second signal 32 follows actuation of the third switch 24 of the second switch unit 20. The third signal 34 is generated once the first switch 16 of the first switch unit 12 and the third switch 24 of the second switch unit 20 are actuated concurrently. In the first embodiment, actuating the second switch 18 of the first switch unit 12 does not initiate any of the first, second, or third signals 30, 32, 34. This embodiment is shown in FIG. 4. Also shown in FIG. 4 is a representation of the switch signal logic included in the control unit 28, the switch signals received when a switch is actuated by the user and subsequently the corresponding signal to be processed determined. Thus, a command is sent by the control unit 28 to the bicycle component to be controlled. In an embodiment implementing PLC, the PLC controller may execute the switch signal logic. It will be appreciated that in other embodiments other types of electronic control or control devices may be implemented.

In the first embodiment, the control unit 28 relays signals to bicycle components as indicated in FIG. 4, which may include the front derailleur 7, the rear derailleur 8, the suspension system SS, a seat post assembly including the seat post T and the bicycle seat S, front and rear brakes 5, 6, and an assist force control unit. As shown in FIG. 4, an electronic shift device of the front derailleur 7 may include a front derailleur shift controller unit, a front derailleur position sensor, a front derailleur motor driver, and a front derailleur motor. The rear derailleur 8 may include a similar configuration. A suspension controller unit of an electronic suspension system may be operated by signals from the control unit 28 as well, effecting a control of a damping system and/or spring system of the suspension system SS. The seat post T may be adjusted by signals from the control unit 28 to an assembly controller unit that controls a seat post motor driver and a seat post motor. The control unit 28 may additionally control the front and rear brake device 5,6, by operation of a hydraulic system that may be controlled by a brake controller unit. Also, an assist force driving motor may be controlled by signals from the control unit 28 to an assist force controller unit, such that an assist force motor is activated. The electrical system associated with each of these bicycle components may or may not include a controller unit specific to the bicycle component being controlled by the control unit 28, a position sensor, a motor driver, and a motor. In an alternative embodiment, the controller unit specific to the bicycle component being controlled may be included with the control unit 28.

The first switch group 14 is oriented in relation to the first switch 16 in a first direction D1, and the second switch group 22 is oriented in relation to the third switch 24 in the first direction D1. FIG. 3 indicates first direction D1 as a vertical direction with respect to bicycle center plane C1. In the first embodiment, the second switch 18 is below the first switch 16 along the vertical direction D1. The second switch group 22 mirrors the form of the first switch group 14, where the third switch 24 is at the top of the second switch group 22 along the vertical direction D1.

The first switch unit 12 includes a first housing 44 on which the first switch group 14 is provided, and the second switch unit 20 includes a second housing 46 on which the second switch group 22 is provided. First housing 44 and second housing 46 are indicated schematically in FIG. 3. It will be appreciated that the housing may take any number of forms as appropriate to the design and engineering of the electrical bicycle operating system 10. FIG. 3 shows first housing 44 as engaged with the handlebar H according to the first embodiment.

In the first embodiment, the first switch 16 is housed in the first housing 44 and the third switch 24 is housed in the second housing 46, as shown in FIG. 3. Also in FIG. 3 the second switch 18 is shown to be housed in the first housing 44 with the first switch 16. The first housing 44 is configured to mount to one of a right part or a left part of the handlebar H. In the first embodiment, the first housing 44 mounts to the first side S1 or left side of the handlebar H, as shown in FIG. 3. The second housing 46 is configured to mount to the other one of the right part or the left part of the handlebar H. In FIG. 3, the second housing 46 mounts to the second side S2 or right side of the handlebar H opposite from the first housing 44 in accordance with the first embodiment. The first housing 44 is disposed to receive user input from a first thumb of a user, and the second housing 46 is disposed to receive user input from a second thumb of the user.

Given the arrangement of the first housing 44 and the second housing 46 in the first embodiment, the first and second switches 16, 18 may be actuated by the left thumb of a user riding the bicycle 1; the third switch 24 may be actuated by the right thumb of the user. The first and second switches 16, 18 according to the first embodiment in FIG. 3 can be configured to have a form to accommodate reception of the left thumb of the user by contouring the surface of the switches, so that the switches may be operated by the user sliding the left hand along the handlebar H with minimal movement for the left thumb to reach and actuate the switches. Thus, the electrical bicycle operating system 10 is operated by the user easily and by allowing the rider to maintain contact with the handlebar H. Alternatively, the first and second switches may be operated by the right thumb and/or digit of the user and the third switch operated by the left thumb and/or digit of the user. Contouring of the switch surfaces may be formed to accommodate reception of any particular digit of the user.

Figure 5:
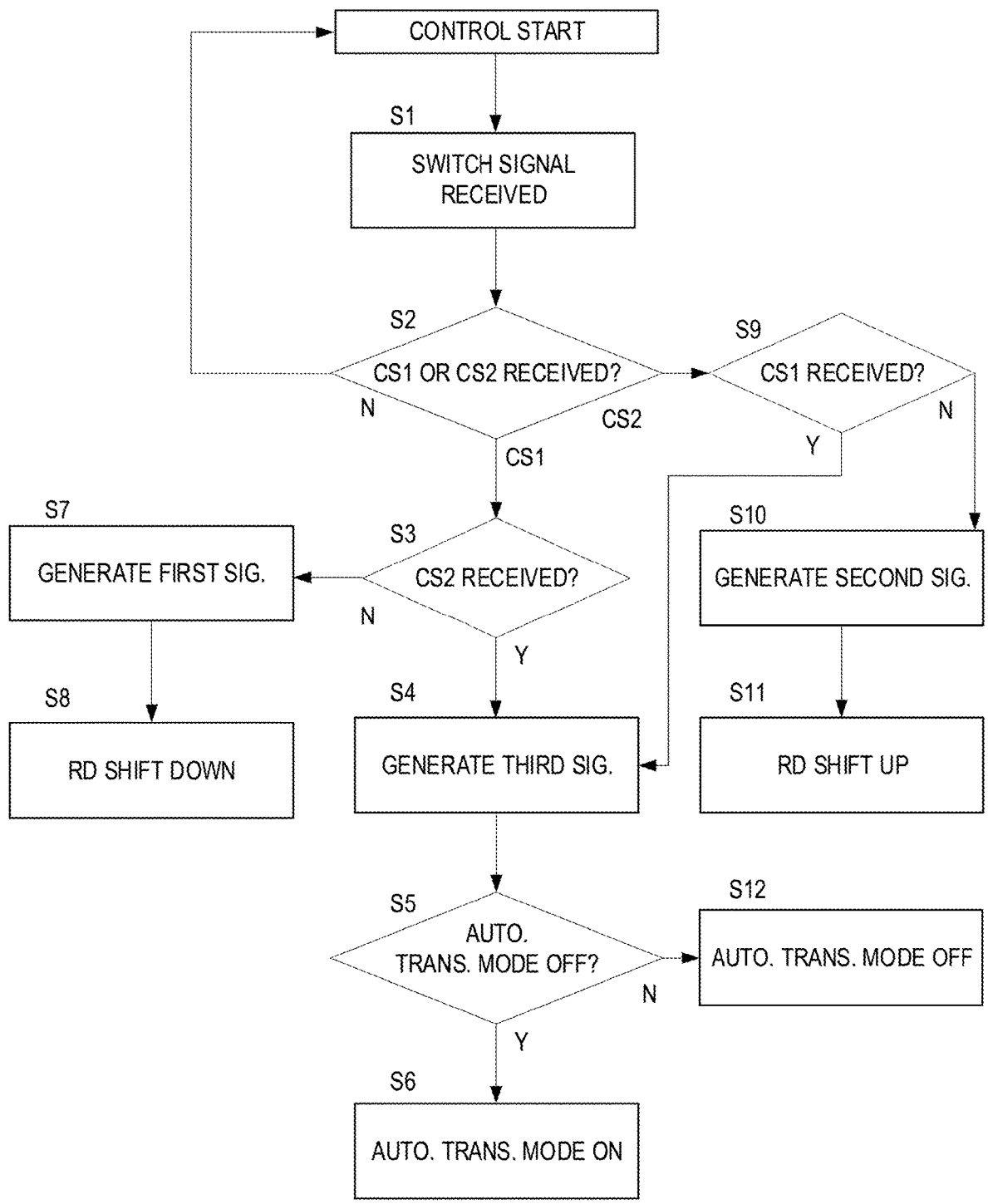
FIG. 5 is a schematic of the operation of the control unit of FIG. 4 of the electrical bicycle operating system.

Turning to FIG. 5, an example control operation of the control unit 28 according to the first embodiment is shown. According to the first embodiment, the first signal 30 includes one of an upshift signal and a downshift signal, and the second signal 32 includes the other of the upshift signal and the downshift signal. The example control operation shown in FIG. 5 is for the execution of commands associated with the first signal 30, the second signal 32, and the third signal 34. It will be appreciated that a similar control operation may be executed for a plurality of signals in additional embodiments. At the start of the control operation is step S1, where the control unit 28 detects that a switch control signal has been received from user actuation of a switch. At step S2, the control unit 28 determines whether or not the received signal is a first control signal CS1 from the first switch 16, or a second control signal CS2 from the third switch 24. If the received signal is neither control signal CS1 nor control signal CS2, the control operation is terminated, and the sequence returns to the start.

If the received signal is first control signal CS1, the control operation proceeds to step S3. At step S3, the control unit 28 determines whether second control signal CS2 is also received. It will be appreciated that the control unit 28 may employ a predetermined delay period where, if either the first switch 16 or the third switch 24 has been actuated and either first control signal CS1 or the second control signal CS2 is received by the control unit 28, the predetermined delay period begins. The predetermined delay period may ensue for a pre-set amount of time, during which reception of the other of the first or second control signals CS1, CS2 initiates generation of the third signal 34 at the control unit 28. However, if the other of the first or second control signals CS1, CS2 is not received in the predetermined amount of time, the predetermined delay period may end and subsequently only the first signal 30 or the second signal 32 is generated, depending on whether the first switch 16 or the third switch 24 was actuated by the user. It will be appreciated that actuation of the first switch 16 and the third switch 24 may overlap such that the first control signal CS1 and the second control signal CS2 overlap, the control unit 28 being configured to receive and distinguish overlapping signals.

If the second control signal CS2 is also received by the control unit 28, the control operation proceeds to step S4. At step S4, the third signal 34 is generated since both the first switch 16 and the third switch 24 have been actuated by the user. Following generation of the third signal 34 at step S4, at step S5 the control unit 28 determines whether an automatic transmission mode of the bicycle 1 is on or off. If the automatic transmission mode is off, at step S6 the third signal 34 initiates turning on of the automatic transmission mode. If the automatic transmission mode is on, at step S12 the third signal 34 initiates turning off the automatic transmission mode.

As described above, at step S3 the control unit 28 determines whether second control signal CS2 has also been received when the first control signal CS1 is received at step S2. If the second control signal CS2 is not received, which may be determined by the end of the predetermined delay period as described above, the control operation moves to step S7 where the first signal 30 is generated, since the first switch 16 has been actuated by the user but not the third switch 18. At step S8, according to this embodiment, the rear derailleur 8 is shifted down when the first signal 30 is generated by the control unit 28 and processed to the rear derailleur 8.

Returning to step S2, if the received signal is not first control signal CS1 but second control signal CS2 from actuation of the third switch 24, the control operation moves to step S9. Similarly to step S3, where the control unit 28 determines whether second control signal CS2 is also received, at step S9 the control unit 28 determines whether the first control signal CS1 is also received. As described above, a predetermined delay period may be employed by the control unit 28 to allow for a sufficient amount of time during which the first control signal CS1 may also be received. If, at step S9, the first control signal CS1 is received, the control operation moves to step S4 where the third signal 34 is generated. If, however, the first control signal CS1 is not received, the control operation moves to step S10. At step S10, since only the second control signal CS2 from actuation of the third switch 24 has been received by the control unit 28, the second signal 32 is generated. At step 511, according to this embodiment, the rear derailleur 8 is shifted up when the second signal 32 is generated by the control unit 28 and processed to the rear derailleur 8.

FIG. 6 presents in table form multiple embodiments of the electrical bicycle operating system 10 showing switch combinations and associated operations. The first embodiment is shown in ROW 1 of the table. First switch 16 and third switch 24 are shown in FIG. 4 to be associated with the first signal 30 and the second signal 32, respectively. According to the first embodiment, the first switch 16 is the left switch and the third switch 24 is the right switch. In this embodiment, the first switch 16 sends the first signal 30 via the control unit 28 to shift the rear derailleur 8 down, and the third switch 24 sends the second signal 32 via the control unit 28 to shift the rear derailleur up. It will be appreciated that other embodiments are possible, as shown in FIG. 6. ROW 2 of the table in FIG. 6 shows an additional embodiment where the first switch 16 sends the first signal 30 via the control unit 28 to shift the front derailleur 7 down, while the third switch 24 sends the second signal 32 via the control unit 28 to shift the front derailleur 7 up.

A few of the additional possible embodiments that are variations of the first embodiment are given in ROWS 3-5 of the table in FIG. 6. From these examples and other possible embodiments, it will be appreciated that the first signal 30 and the second signal 32 are indicative of operating at least one bicycle component selected from the group consisting of an electronic shifting device, an electronic suspension system, an electrical seat post assembly, a brake device, and a driving motor for assist force. In the embodiment of operating the driving motor for assist force, different modes of the assist force may be available. For example, the assist force control unit may be in various modes: a walk mode whereby the assist force motor accommodates the user walking along side the bicycle 1, a trail mode in which the assist force motor responds to trail-riding conditions, a boost mode that aids the user's power in propelling the bicycle 1, and an eco mode where less power is provided by the assist force motor compared to the boost mode. In one embodiment, the assist force control unit is configured to cycle through a range of programmed modes. In such an embodiment, when the first switch is actuated the assist force control unit cycles through the assist modes in a sequential order. When the second switch is actuated, the assist force control unit cycles in a reverse sequential order through the assist modes. This may be referred to as "assist force mode down" and "assist force mode up", respectively, as shown in Rows 3 and 4 of FIG. 6. Additionally, an operation of a wireless unit, camera, or other control functions of the control unit 28 may be effected by way of the first signal 30 and the second signal 32.

In the first embodiment, the third signal 34 is generated when the first switch 16 and the third switch 24 are actuated concurrently, as shown in FIG. 4. As shown in the table of FIG. 6 the first embodiment given in ROW 1 describes the concurrent actuation of both the first switch 16 and the third switch 24 as associated with turning the automatic transmission mode on and off. Specifically, if the automatic transmission is off, generation of the third signal 34 initiates the automatic transmission to be on. Similarly, if the automatic transmission mode is on, generation of the third signal 34 initiates the automatic transmission to be off. As stated above, ROWS 3-5 of the table in FIG. 6 present a few additional possible embodiments that are variations of the first embodiment. These control variations may be set in accordance to the needs and desires of the user. It will be appreciated that, given these control variations, the third signal 34 includes at least one signal selected from the group consisting of an automatic shifting signal, a synchro shifting mode signal, a setting screen transition signal, and an electrical seat post assembly signal. Accordingly, the third signal 34 is indicative of operating at least one bicycle component selected from the group consisting of an automatic shifting device, a synchro shifting device, a setting screen device, and an electrical seat post assembly. The control variations are not limited to those listed here, and can include, as given in FIG. 6, at least assist force mode control, suspension mode control, walk mode on/off, power meter calibration on/off, suspension lock/unlock, light on/off, bicycle computer screen on/off, and/or control of a plurality of computer operations of the control unit 28. Additional control variations may be implemented as suits the design of bicycle components and electronic controls.

Second Embodiment

Returning to FIG. 3, a second embodiment is shown where the second switch group 22 includes a fourth switch 26 having a same position as the second position P2 but in the second switch group 22. In this embodiment, the control unit 28 is further configured to generate a fourth signal 36 in a fourth state where the second switch 18 is actuated and the first switch 16 is not actuated, a fifth signal 38 in a fifth state where the fourth switch 26 is actuated and the third switch 24 is not actuated, and a sixth signal 40 in a sixth state where the second switch 18 and the fourth switch 26 are actuated concurrently. FIG. 4 shows the actuation of the second switch 18, the fourth switch 26, and the concurrent actuation of the second switch 18 and the fourth switch 26 as associated with the fourth signal 36, the fifth signal 38, and the sixth signal 40, respectively. In the first and second embodiments, actuating the first switch 16 and/or the third switch 24 does not initiate any of the fourth, fifth, or sixths signals 36, 38, 40.

In the second embodiment, the first switch 16 and the second switch 18 are aligned in a vertical direction as viewed from a perspective of a rider seated on the bicycle 1, and the third switch 24 and the fourth switch 26 are also aligned in the vertical direction as viewed from the perspective of the rider seated on the bicycle 1. This arrangement is shown in FIG. 3, where the vertical direction is the first direction D1.

In the second embodiment, the fourth signal 36 includes one of an upshift signal and a downshift signal, and the fifth signal 38 includes the other of the upshift signal and the downshift signal. It will be appreciated that a control operation may be executed for the fourth signal 36, the fifth signal 38, and the sixth signal 40 similar to that shown in FIG. 5 and described above for the first signal 30, the second signal 32, and the third signal 34. The control operation in the second embodiment also includes a predetermined amount of time where, if a control signal for the second switch 18 is received by the control unit 28 and a control signal for the fourth switch 26 is also received by the control unit 28 during the predetermined amount of time, the control unit 28 generates the sixth signal 40. If actuation of the second switch 18 and the fourth switch 26 overlap, the control unit 28 is configured to receive and distinguish overlapping signals.

The table in FIG. 6 describes the embodiment of the fourth signal 36 and the fifth signal 38 including one or the other of the upshift signal and the downshift signal in ROW 6. As shown, the second switch 18 is the left switch and the fourth switch 26 is the right switch. Actuating the second switch 18 generates the fourth signal 36 via the control unit 28 to shift the rear derailleur 8 down and actuating the fourth switch 26 generates the fifth signal 38 via the control unit 28 to shift the rear derailleur 8 up. It will be appreciated that the second embodiment complements a variation of the first embodiment given in ROW 2 of the table in FIG. 6. In this embodiment, the first and third switches 16, 24 control the upshifting and downshifting of the front derailleur 7 while the second and fourth switches 18, 26 control the upshifting and downshifting of the rear derailleur 8. Other variations of the second embodiment are given in ROWS 7-11 of the table in FIG. 6. From these variations, it will be appreciated that the fourth signal 36 and the fifth signal 38 are indicative of operating at least one bicycle component selected from the group consisting of an electronic shifting device, an electronic suspension system, an electrical seat post assembly, a brake device, and a driving motor for assist force. In the second embodiment, the fourth signal 36 and the fifth signal 38 operate the electronic shifting device, in that the second switch 18 and the fourth switch 26 effect an upshift or downshift of the rear derailleur 8.

The sixth signal 40 includes at least one signal selected from the group consisting of an automatic shifting signal, a synchro shifting mode signal, a setting screen transition signal, and an electrical seat post assembly signal. In the second embodiment, the sixth signal 40 effects a telescopic change of the electrically adjustable seat post, as shown in ROW 6 of the table in FIG. 6. Specifically, generation of the sixth signal 40 initiates the electrical seat post assembly to move the seat post T up. A second generation of the sixth signal 40 initiates the electrical seat post assembly to move the seat post T down. Thus, the user may repeatedly generate the sixth signal 40 until a desired height of the seat post T is reached. It will be appreciated from the variations of the second embodiment that the sixth signal 40 is indicative of operating at least one bicycle component selected from the group consisting of an automatic shifting device, a synchro shifting device, a setting screen device, and an electrical seat post assembly.

As shown in FIG. 3, in the second embodiment the first switch 16 is housed in the first housing 44 and the third switch 24 is housed in the second housing 46; similarly, the second switch 18 is also housed in the first housing 44 and the fourth switch 26 is also housed in the second housing 46.

In the second embodiment, the control unit 28 is further configured to generate a seventh signal 42 at least in a seventh state where selected switches are other than switches selected in the third state and the sixth state. Specifically, the selected switches are the first switch 16 and the second switch 18 or the third switch 24 and the fourth switch 26. This embodiment is shown in FIG. 4 for the seventh signal 42. The selected switches include at least two switches configured to be operated concurrently by one combination of digits selected from the group consisting of one thumb and one index finger of a user, both thumbs of the user, and both index fingers of the user. In FIG. 3, it is shown that one thumb and one index finger of a user operate the third switch 24 and the fourth switch 26. According to the second embodiment, the seventh signal 42 is indicative of shutting down the electrical bicycle operating system 10, such as in a system having driving motor for assist force. It will be appreciated that other combinations of switches may be assigned to generate the seventh signal 42. The combination of switches may be, for example, the first switch 16, the second switch 18, and the third switch 24, or the first switch 16, the third switch 24, and the fourth switch 26.

It will be appreciated that in variations of the first or second embodiments, the electrical bicycle operating system 10 further comprises a wireless communicator 48 configured to transmit, via the control unit 28, at least one of the first signal 30 and the second signal 32. One embodiment of this configuration is shown in FIG. 3 and described above. It will be appreciated that the wireless communicator 48 in other embodiments transmits other signals including the third through seventh signals 34, 36, 38, 40, 42. Other alternative embodiments including wireless communication are described above.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalent.

The invention claimed is:

1. An electrical bicycle operating system comprising:
a first switch unit includes a first switch group configured to be mounted to a bicycle on a first side of a central longitudinal axis of the bicycle, the first switch group including a first switch and a second switch, the first switch having a first position, the second switch having a second position;
a second switch unit includes a second switch group configured to be mounted to the bicycle on an opposite side of the central longitudinal axis from the first side, the second switch group including a third switch having a same position as the first position, in the second switch group; and a control unit configured to generate
a first signal in a first state where the first switch unit is actuated and the second switch unit is not actuated,
a second signal in a second state where the second switch unit is actuated and the first switch unit is not actuated, and
a third signal in a third state where the first switch unit and the second switch unit are actuated concurrently.

2. The electrical bicycle operating system of claim 1, wherein
the first signal includes one of an upshift signal and a downshift signal, and
the second signal includes the other of the upshift signal and the downshift signal.

3. The electrical bicycle operating system of claim 1, wherein
the first signal and the second signal are indicative of operating at least one bicycle component selected from the group consisting of an electronic shifting device, an electronic suspension system, an electrical seat post assembly, a brake device, and a driving motor for assist force.

4. The electrical bicycle operating system of claim 1, wherein
the second switch group includes a fourth switch having a same position as the second position, in the second switch group; and
wherein the control unit further is configured to generate
a fourth signal in a fourth state where the second switch is actuated and the first switch is not actuated,
a fifth signal in a fifth state where the fourth switch is actuated and the third switch is not actuated, and
a sixth signal in a sixth state where the second switch and the fourth switch are actuated concurrently.

5. The electrical bicycle operating system of claim 1, wherein
the first switch group is oriented in relation to the first switch in a first direction, and
the second switch group is oriented in relation to the third switch in the first direction.

6. The electrical bicycle operating system of claim 4, wherein
the first switch and the second switch are aligned in a vertical direction as viewed from a perspective of a rider seated on the bicycle, and
the third switch and the fourth switch are aligned in the vertical direction as viewed from the perspective of the rider seated on the bicycle.

7. The electrical bicycle operating system of claim 1, wherein
the third signal includes at least one signal selected from the group consisting of an automatic shifting signal, a synchro shifting signal, a setting screen transition signal, and an electrical seat post assembly signal.

8. The electrical bicycle operating system of claim 1, wherein
the third signal is indicative of operating at least one bicycle component selected from the group consisting of an automatic shifting device, a synchro shifting device, a setting screen device, and an electrical seat post assembly.

9. The electrical bicycle operating system of claim 4, wherein
the fourth signal includes one of an upshift signal and a downshift signal, and
the fifth signal includes the other of the upshift signal and the downshift signal.

10. The electrical bicycle operating system of claim 4, wherein
the fourth signal and the fifth signal are indicative of operating at least one bicycle component selected from the group consisting of an electronic shifting device, an electronic suspension system, an electrical seat post assembly, a brake device, and a driving motor for assist force.

11. The electrical bicycle operating system of claim 4, wherein
the sixth signal includes at least one signal selected from the group consisting of an automatic shifting signal, a synchro shifting signal, a setting screen transition signal, and an electrical seat post assembly signal.

12. The electrical bicycle operating system of claim 4, wherein
the sixth signal is indicative of operating at least one bicycle component selected from the group consisting of an automatic shifting device, a synchro shifting device, a setting screen device, and an electrical seat post assembly.

13. The electrical bicycle operating system of claim 1, wherein
the first switch unit includes a first housing on which the first switch group is provided, and
the second switch unit includes a second housing on which the second switch group is provided.

14. The electrical bicycle operating system of claim 4, wherein
the first switch is housed in a first housing and the third switch is housed in a second housing; and
the second switch is also housed in the first housing and the fourth switch is also housed in the second housing.

15. The electrical bicycle operating system of claim 14, wherein
the first housing is configured to mount to one of a right part or a left part of a handlebar.

16. The electrical bicycle operating system of claim 14, wherein
the second housing is configured to mount to the other one of the right part or the left part of the handlebar.

17. The electrical bicycle operating system of claim 14, wherein
the first housing is disposed to receive user input from a first thumb of a user; and
the second housing is disposed to receive user input from a second thumb of the user.

18. The electrical bicycle operating system of claim 4, further comprising:
the control unit further configured to generate a seventh signal at least in a seventh state where selected switches are other than switches selected in the third state and the sixth state.

19. The electrical bicycle operating system of claim 18, wherein
the selected switches include at least two switches configured to be operated concurrently by one combination of digits selected from the group consisting of one thumb and one index finger of a user, both thumbs of the user, and both index fingers of the user.

20. The electrical bicycle operating system of claim 18, wherein the seventh signal is indicative of shutting down the electrical bicycle operating system.

21. The electrical bicycle operating system of claim 1, further comprising
a wireless communicator configured to transmit, via the control unit, at least one of the first signal and the second signal.

* * * * *